United States Patent [19]

Nelson

[11] Patent Number: 5,509,566
[45] Date of Patent: Apr. 23, 1996

[54] WATER HEATER CONSTRUCTION AND SEALING DEVICE THEREFOR

[75] Inventor: Thomas E. Nelson, Anchorage, Ky.

[73] Assignee: Soltech, Inc., Shelbyville, Ky.

[21] Appl. No.: 323,395

[22] Filed: Oct. 14, 1994

Related U.S. Application Data

[63] Continuation of Ser. No. 270,326, Jul. 5, 1994, Pat. No. 5,421,475, which is a continuation-in-part of Ser. No. 465,030, Jan. 16, 1990, Pat. No. 4,972,967, which is a continuation-in-part of Ser. No. 177,392, Apr. 4, 1988, abandoned.

[51] Int. Cl.$^6$ .................................................. B65D 90/00
[52] U.S. Cl. ..................... 220/444; 220/448; 126/361; 126/375
[58] Field of Search ................................. 220/444, 448, 220/466, 469; 126/361, 375

[56] References Cited

U.S. PATENT DOCUMENTS

| | | | |
|---|---|---|---|
| 2,103,677 | 12/1937 | Kline et al. | 220/448 |
| 3,197,066 | 7/1965 | Denzler et al. | |
| 4,372,028 | 2/1983 | Clark. | |
| 4,447,377 | 5/1984 | Denton. | |
| 4,477,399 | 10/1984 | Tilton | 264/45.2 |
| 4,875,272 | 10/1989 | Nelson. | |
| 4,878,482 | 11/1989 | Pfeffer | 220/444 X |
| 4,890,762 | 1/1990 | Pfeffer | 220/444 |
| 4,901,676 | 2/1990 | Nelson | 220/444 X |
| 4,945,892 | 8/1990 | Chevalier et al. | 220/444 |
| 4,957,097 | 9/1990 | Chevalier et al. | 220/444 |
| 4,972,967 | 11/1990 | Nelson | 220/444 |
| 5,040,697 | 8/1991 | Nelson | 220/444 |
| 5,163,214 | 11/1992 | Calero | 220/444 X |
| 5,209,368 | 5/1993 | Bradenbaugh | 220/448 |
| 5,213,728 | 5/1993 | Hickman | 220/444 X |

*Primary Examiner*—Steven M. Pollard
*Attorney, Agent, or Firm*—Woodard, Emhardt, Naughton, Moriarty & McNett

[57] ABSTRACT

A water heater construction including an inner tank for containing water surrounded in spaced apart relationship by an outer shell. An outer collar of insulation material is located in the annular space between the inner tank and outer shell at a preselected location within the annular space along the height of the water heater construction. The collar has a radial thickness greater than the radial width of the annular space and is radially compressed between the interior wall of the outer shell and exterior wall of the inner tank. An expandable foam thermal insulation material fills the annular space above the collar. A method of making the water heater construction includes the steps of positioning the collar of insulation material around and in contact with the interior wall surface of the outer shell and moving the outer shell downwardly concentrically over the inner tank displacing the inner perimeter margin of the collar at the interface of the collar and the water tank in a generally upward direction to form a trough in the collar at the top side of the collar.

9 Claims, 9 Drawing Sheets

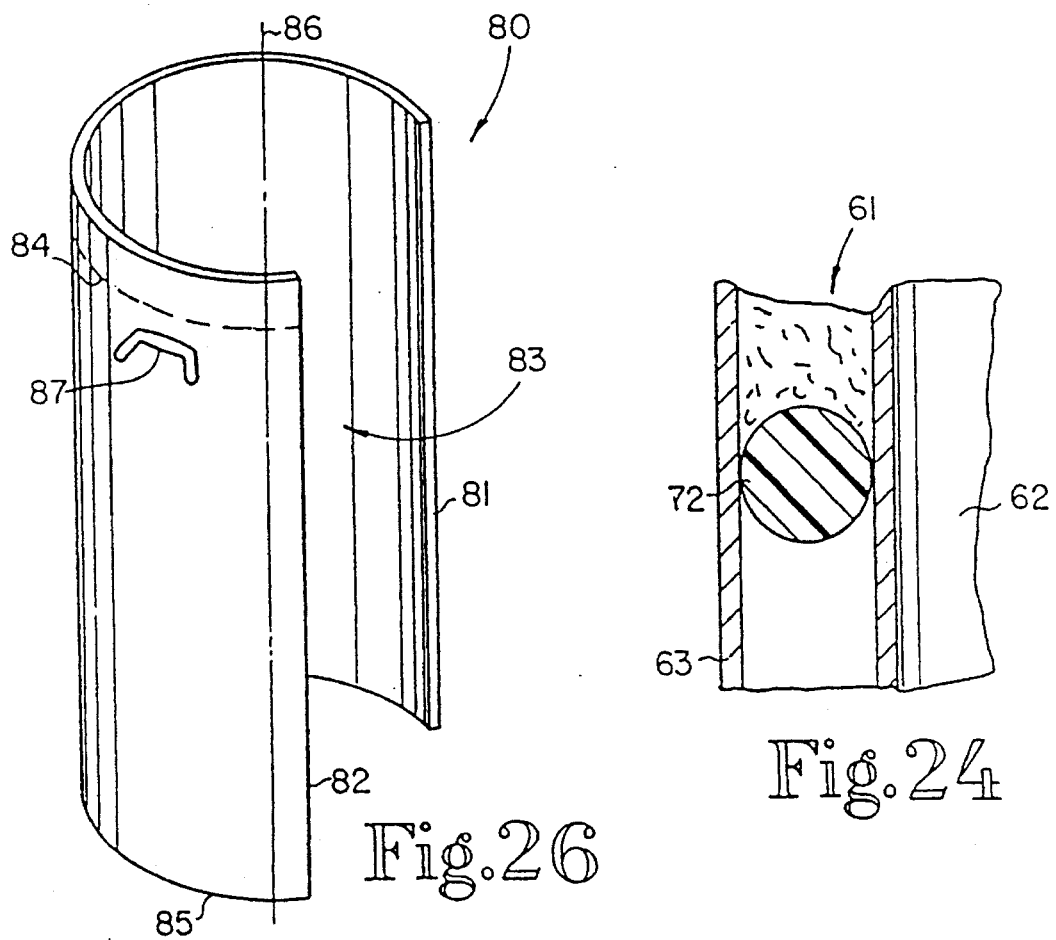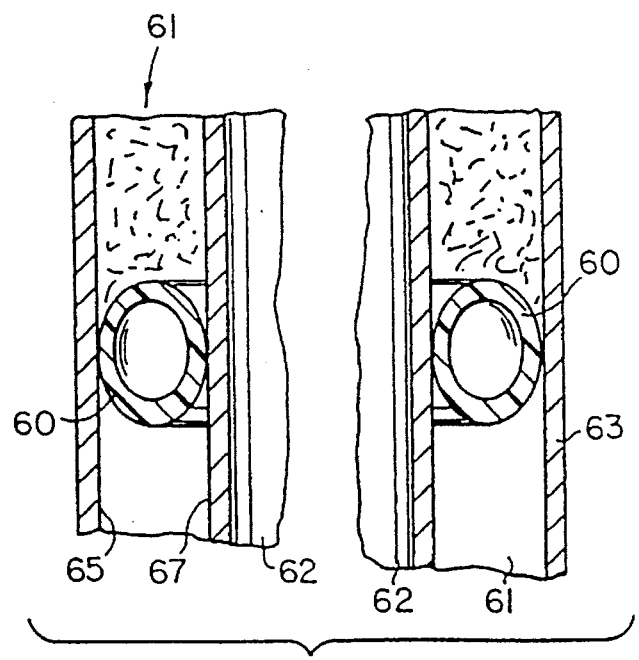

5,509,566

WATER HEATER CONSTRUCTION AND SEALING DEVICE THEREFOR

CROSS-REFERENCE TO RELATED APPLICATION

This patent application is a continuation of patent application Ser. No. 270,326, filed Jul. 5, 1994, now U.S. Pat. No. 5,421,475, which is a continuation-in-part patent application of prior patent application Ser. No. 465,030, filed Jan. 16, 1990, now U.S. Pat. No. 4,972,967, which is a continuation-in-part patent application of Ser. No. 177,392, filed Apr. 4, 1988, now abandoned.

BACKGROUND OF THE INVENTION

The present invention relates generally to hot water heaters and more particularly to a termally insulated water heater construction, a sealing device therefor, and a method of manufacturing the water heater.

Typically, water heaters are formed of an inner water tank with an outer shell located over the inner tank with an annular space therebetween. The space between the inner tank and outer shell is filled with a thermal insulation. For many years fiberglass has been used as the insulation material between the inner tank and outer shell. More recently, a foam such as urethane has been used as the thermal insulation material in place of fiberglass between the inner tank and outer shell. Typically, foamable material is injected into the space between the inner tank and outer shell, and is allowed to foam in situ. However, there is a problem in restraining the expanding foam within the annular space and more particularly within a predetermined location or region with the annular space. This specific locational confinement of the foam is important when using such foam insulation in a gas-fired water heater. In such an application it is extremely important to keep flammable foam away from the gas burner of the water heater. Over the years various proposals have been made to solve this problem.

U.S. Pat. No. 4,372,028 issued to Clark on Feb. 8, 1983 shows a water heater having a foam-filled closed collar located in the annular space between the inner tank and outer shell at the bottom of the inner tank, and the annular space above the collar filled with expanded foam. The collar functions as a stop to the expanded foam in the annular space thereabove. This patent further shows a method of manufacturing the water heater which includes the steps of forming a flexible, expandable closed elongated bag having a hole therein through which an expandable foam can be injected into the bag. The bag is filled with a foam material which expands the bag to form a collar, but before the foam material has had sufficient time to fully expand, the bag opening is sealed and the bag is circumferentially wrapped around the lower end of the tank with the bag ends overlapping each other. Next, and still before the foam material in the collar has had sufficient time to fully expand, the outer shell is positioned over the inner tank and bag. The foam in the bag continues expanding forming a collar which is in compression between the inner tank and outer shell. The annular space above the collar is then filled with expandable foam material.

U.S. Pat. No. 4,447,377 issued to Denton on May 8, 1977 shows a gas-fired water heater wherein a layer of fiberglass insulation material is wrapped around the bottom portion of the inner water tank around the combustion chamber and a plastic envelope is wrapped around the inner tank above the fiberglass insulation. The envelope is in the form of an elongated thin tube having an inner wall, an outer wall, a bottom wall, two end walls and an open top. When wrapped around the inner tank, the end walls of the envelope abut each other. The outer shell is positioned over the inner tank such that the envelope is in the annular space therebetween. Expandable foam is injected through the open envelope top into the envelope and allowed to expand therein.

U.S. Pat. No. 4,477,399 issued to Tilton on Oct. 16, 1984 shows a water heater having a inflatable toroidally shaped tube located around the bottom end of the inner tank such that when the toroidal tube is inflated with air, it seals the bottom end of the annular space between the inner tank and outer shell. A foamable material is then injected into the annular space above the toroidal tube to fill the annular space.

U.S. Pat. No. 4,875,272 issued to Nelson on Oct. 24, 1989 shows a water heater construction having a wedge-shaped member disposed between the inner water tank and the outer shell wherein the apex of the wedge is pointed in a downward direction and the base of the triangular shape opens upwardly into the annular clearance space between the tank and shell. This open base portion is designed so as to receive a portion of the liquid foam-in-place insulation which is used to insulate around the tank and between the shell such that as the material foams in place a force is exerted on the sides of the wedge due to the expanding foam thereby increasing the degree of interference between the sides of the wedge and the tank and shell.

SUMMARY OF THE INVENTION

The present invention provides a water heater construction, a sealing device used in the water heater construction, and method of manufacturing a water heater construction which provides for easy assembly.

More particularly, the present invention provides a water heater construction comprising an inner water tank, an outer shell concentrically located over the inner water tank defining an annular space therebetween, a collar of resilient material located in the annular space, the collar having a radial thickness greater than the radial width of the annular space, the collar having an annular trough formed in the top side of the collar, and the collar being radially compressed between the exterior wall surface of the water tank and the interior wall surface of the outer shell.

The present invention also provides a sealing device for use in a water heater construction in the annular space between a water tank and concentrically disposed outer shell, the sealing device comprising a collar of resilient, flexible material to be concentrically located within the annular space having a radial thickness greater than the radial width of the annular space. A mechanical stop is provided for controlling the downward location of the collar relative to the water tank.

The present invention further provides a method for making a water heater construction of the type having an inner water tank and an outer shell concentric with and spaced from the inner water tank defining an annular space therebetween, comprising the steps of positioning a collar of resilient thermal insulation material around and in contact with the inside wall surface of the outer shell, the collar having a radial thickness greater than the radial width of the annular space, and moving the outer shell downwardly coaxially over the full length of the water tank radially compressing the collar between the outer shell and inner water tank in the annular space therebetween and displacing or deflecting the inner perimeter margin of the collar at the interface of the collar and water tank in a generally upward direction to form a trough in the collar at the top side of the collar.

The present invention even further provides another method of making a water heater construction of the type having an inner water tank and an outer shell concentric with and spaced from the inner water tank defining an annular space therebetween, comprising the steps of positioning a collar of resilient insulation material around and in contact with the perimeter of the inner water tank, the collar having a radial thickness greater than the radial width of the annular space, and moving the water tank downwardly into the outer shell the full length of the outer shell radially compressing the collar between the outer shell and water tank in the annular space therebetween and displacing or deflecting the outer perimeter margin of the collar at the interface of the collar and outer shell in a generally upward direction to form a trough in the collar at the top side of the collar.

BRIEF DESCRIPTION OF THE DRAWINGS

A better understanding of the present invention will be had upon reference to the following description in conjunction with the accompanying drawings in which like numerals refer to like parts throughout the several views.

FIG. 24 is a partial, front elevational view in full section of an alternate collar design disposed between a water heater tank and shell.

FIG. 25 is a partial, front elevational view in full section of the FIG. 20 collar design disposed between a water heater tank and shell.

FIG. 26 is a perspective view of a pushing device suitable for use in installing the FIG. 20 collar into the annular clearance space between the water heater tank and outer shell.

DESCRIPTION OF THE PREFERRED EMBODIMENT

Figure 1:
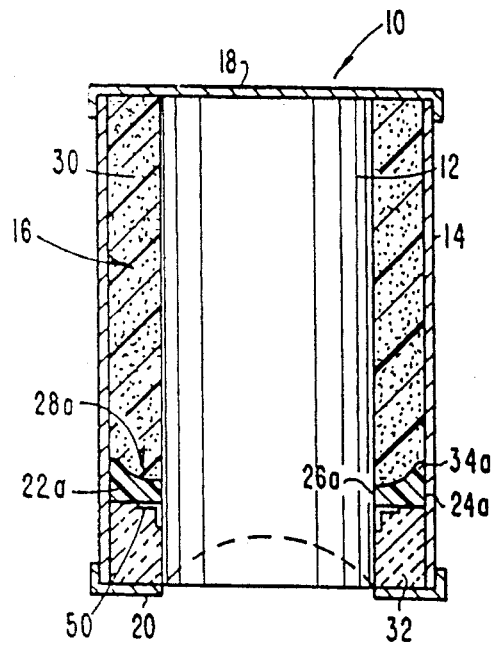
FIG. 1 is a schematic representation, in transverse cross-section, of a water heater construction according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIGS. 1–10 schematically illustrate conventional type water heater construction, generally denoted as the numeral 10, having an inner water tank 12 for containing water and an outer shell 14 concentrically surrounding the inner water tank 12. The outer shell 14 and inner water tank 12 cooperate to define an annular space 16 therebetween. The water heater device 10 is also shown as having a cap 18 and a floor 20 closing the top end and bottom end of the annular space 16, respectively.

With continued reference to FIGS. 1–10, one of a variety of annular collars 22a–22h of resilient insulation material is located in the annular space 16. The collar 22a–22h is fabricated of a nonflammable heat insulation material, for example, a fiberglass or foamed material such as urethane, polyethylene, polystyrene, plastic, rubber and the like. Hereinafter a general or generic reference o the collars will be denoted by reference numeral 22. Specific reference to one of the various collar styles will be made by use of the letter suffix. This same approach will be followed for portions of each collar.

The collar 22 is located circumferentially within the annular space 16 at a preselected location. In the preferred embodiment, the annular collar 22 has a radial thickness greater than the radial width of the annular space 16 such that the collar 22 is radially compressed between the exterior wall surface of the inner water tank 12 and the interior wall surface of the outer shell 14 so that the outer circumferential edge 24 of the collar 22 is compressed and-partially flattened so as to be in sealing contact with the interior wall surface of the outer shell 16 and the inner circumferential edge 26 of the collar 22 is likewise in a slightly flattened condition and in sealing contact with the exterior wall surface of the water tank 12. An annular trough 28 is defined at the top side of the collar 22 with the opening of the trough facing upwardly toward the top of the water heater construction 10. The portion of the annular space 16 above the annular collar 22 is filled with an expanded foam thermal insulation material 30 such as urethane, polyethylene, polystyrene and the like, which functions as thermal insulation surrounding the inner water tank 12.

The trough 28 of the collar 22 in cooperation with the compression of the collar resist the pressure generated by the expanding foam material 30 and prevent leakage past the collar 22 between the interface of the outer circumferential edge 24 of the collar 22 and the interior wall surface of the outer shell 14 and between the interface of the inner circumferential edge 26 of the collar 22 and the exterior wall surface of the water tank 12. The risk of leakage is greatest when foamable material 30 is in its liquid state as it is being injected into the annular space 16 and is just beginning the process of foaming. The portion of the annular space 16 beneath the collar 22 can be filled with a fibrous insulation 32.

Figure 11:
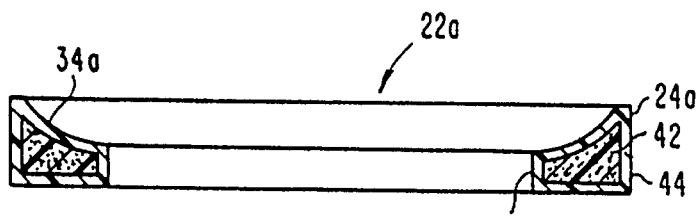
FIG. 11 is a transverse cross-sectional view of a sealing collar device used in the water heater construction of the present invention.

With reference to FIGS. 1 and 11, the collar 22a has a generally upwardly projecting annular lip 34a at the outside annular margin of the collar 22a which cooperates with the top surface of the collar 22a to define the annular trough 28a. The annular lip 34a is in abutting juxtaposition with the interior wall surface of the outer shell 14.

Figure 2:
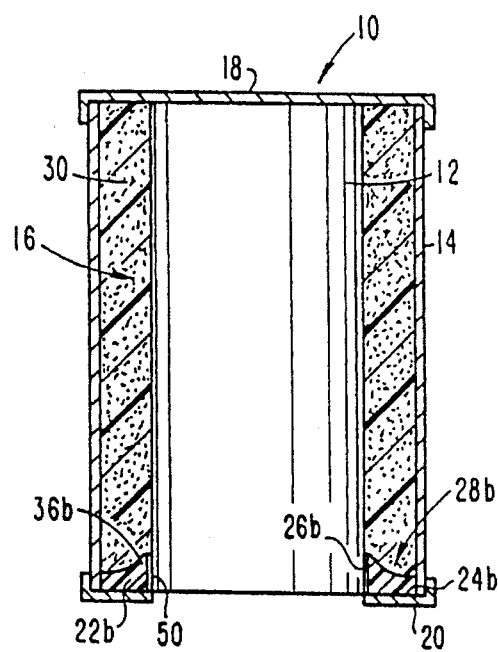
FIG. 2 is a schematic representation, in transverse cross-section, of another embodiment of a water heater construction according to the present invention.
Figure 12:
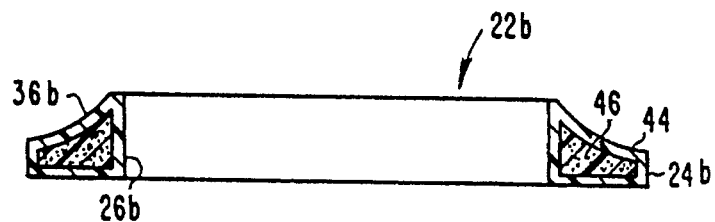
FIG. 12 is a transverse cross-sectional view of another sealing collar device used in the water heater construction of the present invention.

With reference to FIGS. 2 and 12, the collar 22b has a generally upwardly projecting annular lip 36b at the inside annular margin of the collar 22b which cooperates with the top surface of the collar 22b to define the annular trough 28b. The annular lip 36b is in abutting juxtaposition with the exterior wall surface of the water tank 12.

Figure 3:
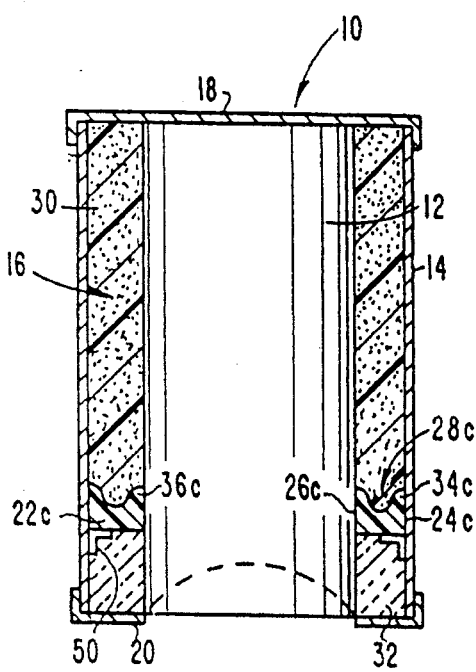
FIG. 3 is a schematic representation, in transverse cross-section, of yet another embodiment of a water heater construction according to the present invention.
Figure 13:
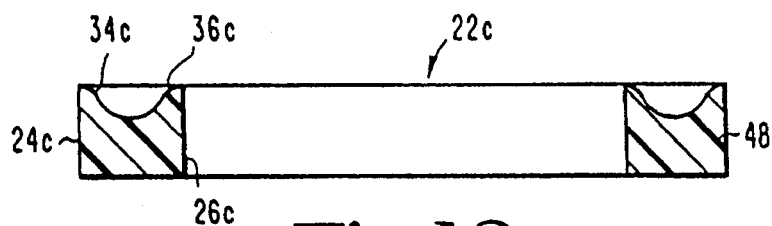
FIG. 13 is a transverse cross-sectional view of yet another sealing collar device used in the water heater construction of the present invention.

Now with reference to FIGS. 3 and 13, the collar 22c has a generally upwardly projecting annular lip 34c at the outside annular margin of the collar 22c and another generally upwardly projecting annular lip 36c at the inside annular margin of the collar 22c which cooperate with the top surface of the collar 22c to define the annular trough 28c. The annular lip 34c is in abutting juxtaposition with the interior wall surface of the outer shell 14 and the annular lip 36c is in abutting relationship with the exterior wall surface of the water tank 12.

Figure 4:
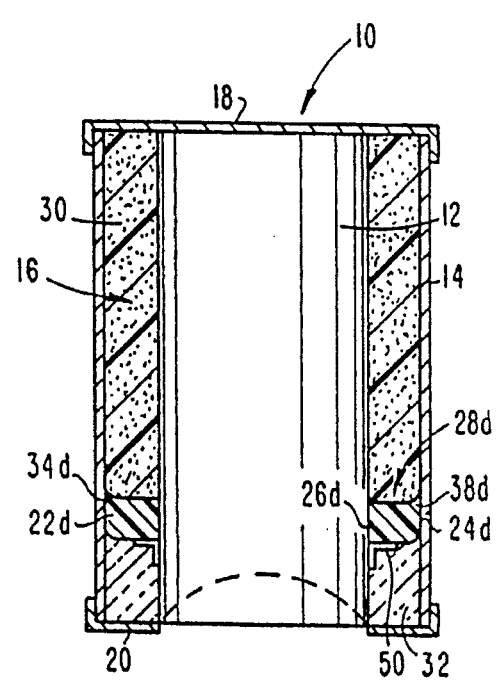
FIG. 4 is a schematic representation, in transverse cross-section, of yet a further embodiment of a water heater construction according to the present invention.
Figure 14:
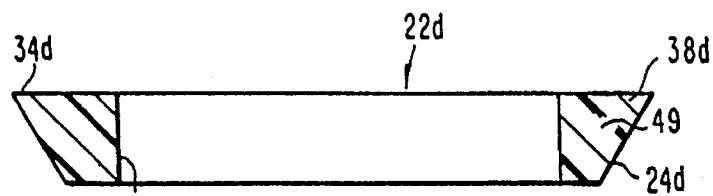
FIG. 14 is a transverse cross-sectional view of still another sealing collar device used in the water heater construction of the present invention.

Now with reference to FIG. 14, the collar 22d has a transverse cross-section generally in the shape of a trapezoid with the outer circumferential edge 24d of the collar 22d beveled outwardly toward the top surface of the collar 22d when the collar 22d is relaxed before installation within the annular space 16. As can be seen in FIG. 4, when the collar 22d is installed in the water heater construction 10 within the annular space 16, the outer perimeter margin 38d of the outer circumferential edge 24d of the collar 22d is displaced in a generally upward direction forming a lip 34d against the interior wall surface of the outer shell 14 which cooperates with the top surface of the collar 22d to define the annular trough 28d.

Figure 5:
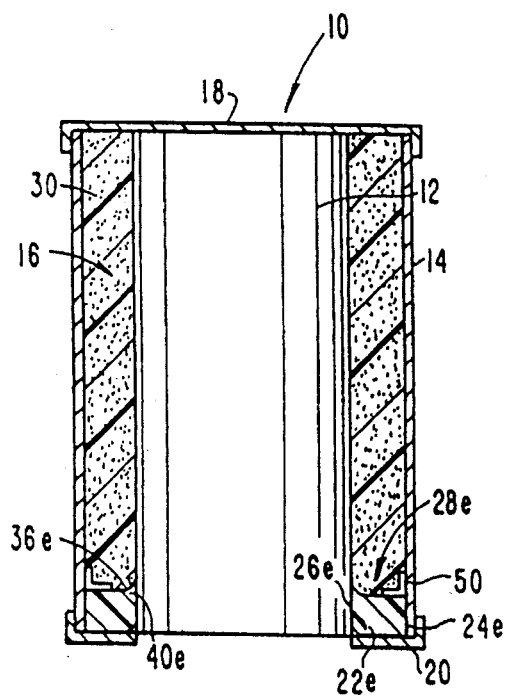
FIG. 5 is a schematic representation, in transverse cross-section, of still another embodiment of a water heater construction according to the present invention.
Figure 15:
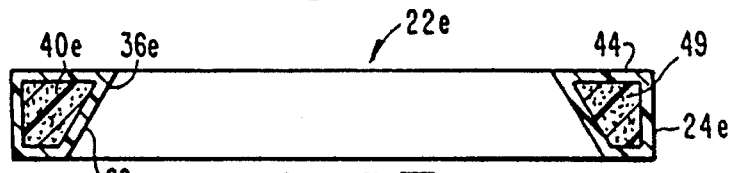
FIG. 15 is a transverse cross-sectional view of yet a further sealing collar device used in the water heater construction of the present invention.

Referring now to FIG. 15, the collar 22e has a transverse cross-section generally in the shape of a trapezoid with the inner circumferential edge 26e of the collar 22e beveled outwardly toward the top surface of the collar 22e when the collar 22e is relaxed before installation with the annular space 16. As can be seen in FIG. 5, when the collar 22e is installed in the water heater construction 10 within in the annular space 16, the outer perimeter margin 40e of the inner circumferential edge 26e is displaced in a generally upward direction forming a lip 36e against the exterior wall surface of the water tank 12 which cooperates with the top surface of the collar 22e to define the annular trough 28e.

Figure 6:
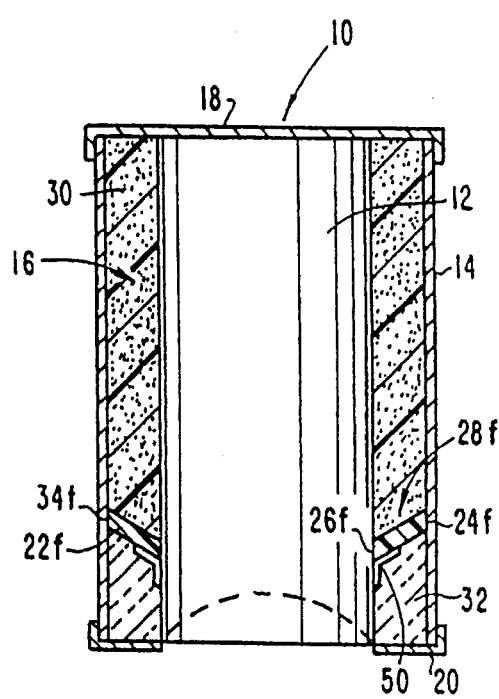
FIG. 6 is a schematic representation, in transverse cross-section, of yet another embodiment of a water heater construction according to the present invention.
Figure 16:
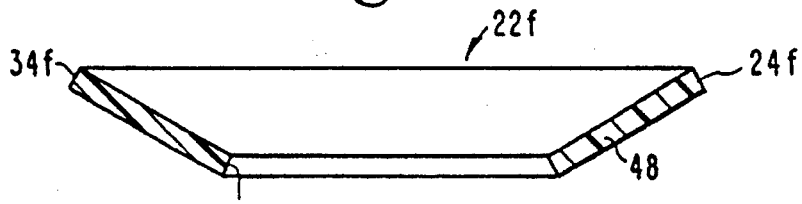
FIG. 16 is a transverse cross-sectional view of still a further sealing collar device used in the water heater construction of the present invention.

With reference to FIG. 16, the collar 22f is generally bowl-shaped in transverse cross-section with the outer circumferential edge 24f at a higher elevation than the inner circumferential edge 26f when the collar is relaxed before installation within the annular space 16. As can be seen in FIG. 6, when the collar 22f is installed in the water heater construction 10 within the annular space 16 the outer circumferential edge 24f lays in overlaying juxtaposition with the interior wall surface of the outer shell 14 forming a lip 34f against the interior wall surface of the water tank and defining the annular trough 28f.

Figure 7:
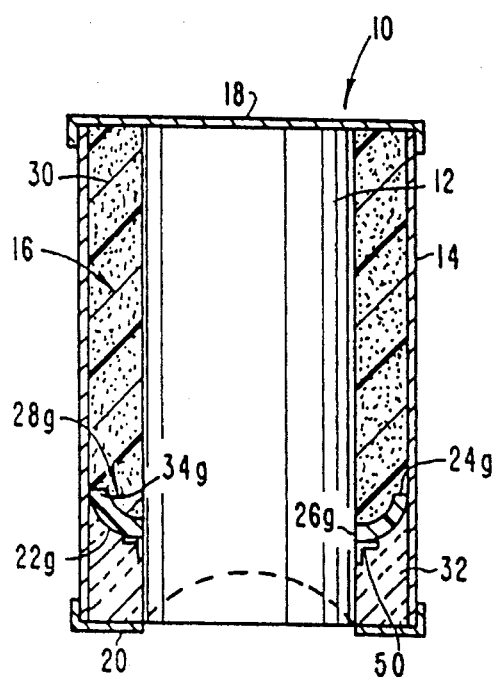
FIG. 7 is a schematic representation, in transverse cross-section, of still another embodiment of a water heater construction according to the present invention.
Figure 8:
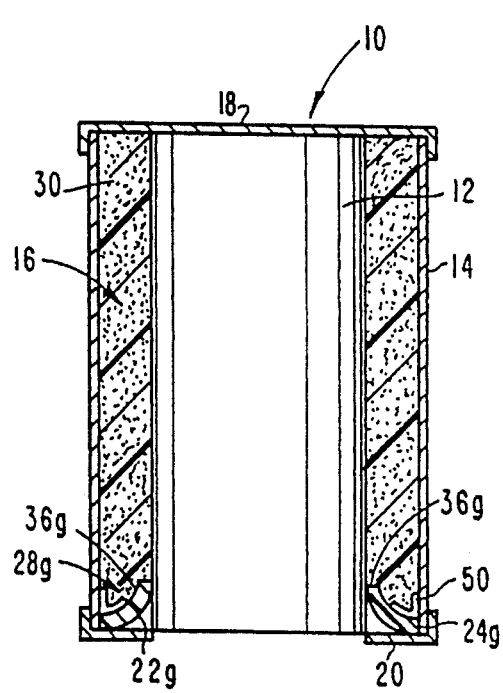
FIG. 8 is a schematic representation, in transverse cross-section, of a further embodiment of water heater construction according to the present invention.
Figure 17:
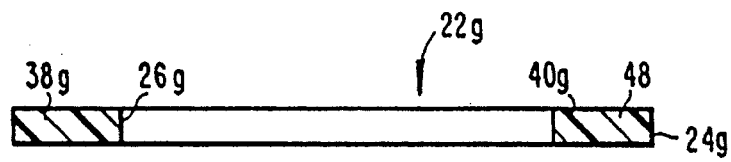
FIG. 17 is a transverse cross-sectional view of yet another sealing collar device used in the water heater construction of the present invention.

With reference to FIG. 17, the collar 22g is a toroid generally square or rectangular transverse cross-section shape with the outer circumferential edge 24g in the same plane as the inner circumferential edge 26g when the collar is relaxed before installation within the annular space 16. Depending upon the various methods of assembly of the water heater construction 10 to be discussed hereinbelow, the collar 22g will assume somewhat different configurations within the space 16. With reference to FIG. 7, the outer circumferential edge 24g is displaced or deflected in a generally upward direction forming a lip 34g against the interior wall surface of the outer shell 14 which cooperates with the top surface of the collar 22g to define the annular trough 28g. Referring to FIG. 8, the inner circumferential edge 26g is displaced or deflected in a generally upward direction forming a lip 36g against the exterior wall surface of the water tank 12 which cooperates with the top surface of the collar 22g to define the annular trough 28g. Now referring to FIG. 9, the outer circumferential edge 24g is displaced or deflected in a generally upward direction forming a lip 34g against the interior wall surface of the outer shell 14 and the inner circumferential edge 26g is displaced or deflected in a generally upward direction forming a lip 36g against the exterior wall surface of the tank 12. The annular lip 34g and annular lip 36g cooperate with the top surface of the collar 22g to define the annular trough 28g.

Figure 18:
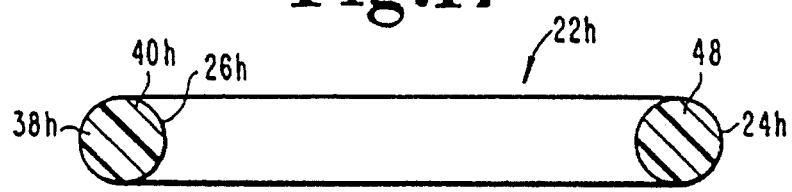
FIG. 18 is a transverse cross-sectional view of still another sealing collar device used in the water heater construction of the present invention.

Now referring to FIG. 18, the collar 22h is a toroid with a generally circular transverse cross-sectional shape when the collar 22h is relaxed before installation within the annular space 16. As can be best seen in FIG. 10, when the collar 22h is installed within the annular space 16, the outer circumferential edge 24h of the collar 22h is displaced in a generally upward direction forming a lip 34h against the interior wall surface of the outer shell 14 and the inner circumferential edge 26h of the collar 22h is displaced in a generally upward direction forming a lip 36h against the exterior wall surface of the water tank 12. Lip 34h an lip 36h cooperate to define an annular trough 28h in the collar 22h.

With reference to FIGS. 11–18, the collar 22 can be constructed of a variety of materials. Referring for example to FIG. 11, collar 22a can be fabricated of a fibrous insulation material 42, for example fiberglass, enclosed in an impermeable envelope 44 of, for example, polyethylene film. With reference to FIG. 12, collar 22b can be fabricated of a loose material 46, for example particles of foam, enclosed in an impermeable envelope 44 of, for example polyethylene film. With reference to FIGS. 13, 16, 17 and 18, the collar 22c, 22f, 22g and 22h, respectively, can be fabricated of an expanded foam material 48, for example, a closed cell foam, or molded rubber, or flexible thermoplastic urethane which has an impermeable outer surface therefore eliminating the envelope 44. With reference to FIG. 14, the collar 22d can be fabricated of, for example, an open cell expanded foam material 49. With reference to FIG. 15, the collar 22e can be fabricated of an open cell expanded foam material 49 enclosed in an impermeable envelope 44.

Figure 9:
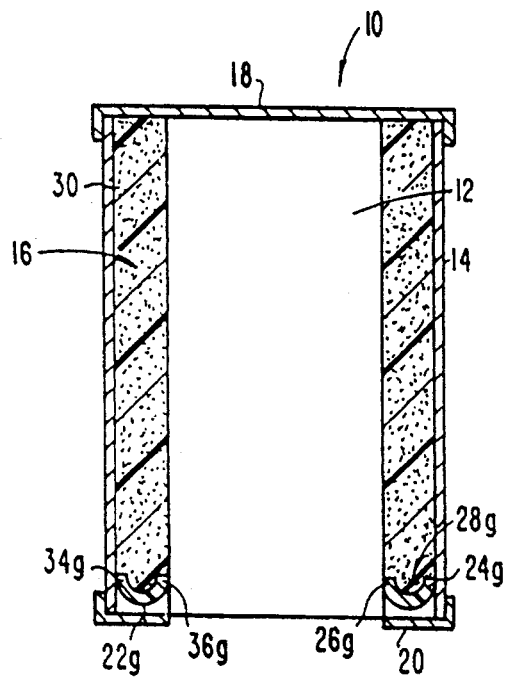
FIG. 9 is a schematic representation, in transverse cross-section, of yet another embodiment of a water heater construction according to the present invention.
Figure 10:
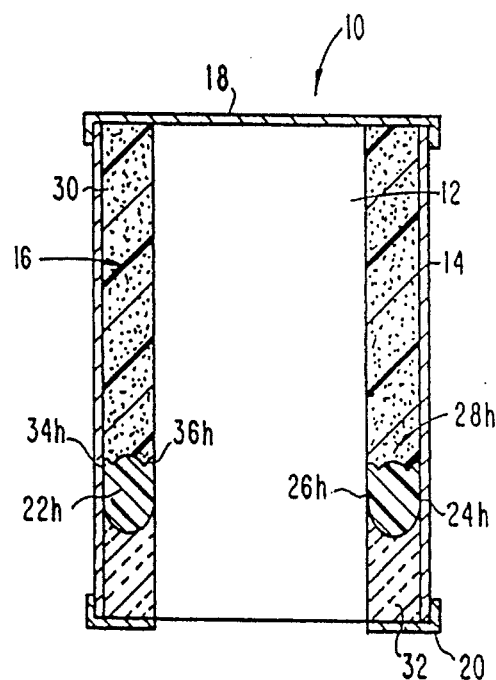
FIG. 10 is a schematic representation, in transverse cross-section, of a further embodiment of a water heater construction according to the present invention.

As shown in FIGS. 1, 2, 4, 6 and 7, the collar 22 can be attached to the exterior wall surface of the water tank 12 by, for example, an adhesive or tape 50. Alternatively, as shown in FIGS. 3, 5 and 8, the collar 22 can be attached to the interior wall surface of the outer shell 14 by, for example, an adhesive or tape 50. The collar can also be wedged between the tank and shell without the use of tape as shown in FIGS. 9 and 10.

The water heater construction 10 show in FIGS. 1, 2, 4, 6 and 7 can be assembled by first positioning the collar 22 of thermal insulation material around the exterior wall surface of the inner water tank 12 with the inner circumferential edge 26 in contact with the exterior wall surface of the water tank 12 at a preselected location therealong, and attaching the collar 22 thereto by using adhesive or tape 50. As shown in FIGS. 1, 4, 6 and 7, the collar 22 is located between the top end and bottom end of the water tank 12, but it should be understood that it can be located any where along the water tank 12, for example, at the bottom end of the water tank as shown in FIG. 2. Next, the water tank is located at the top end of and coaxial with the outer shell 14 and is moved coaxially in a downward direction into the outer shell 14 the full length of the outer shell 14. Alternatively, the outer shell 14 is positioned coaxially at the bottom end of the tank 12 and is moved coaxially in an upward direction over the tank 12 the full length of the tank 12. The collar 22 is then radially compressed between the outer shell 14 and inner water tank 12 in the annular space.

In the embodiments of FIGS. 1, 4, 6 and 7, the outer annular lip 34 overlays the interior wall surface of the outer shell 12, and in the embodiment of FIG. 2, the inner annular lip 36 overlays the exterior wall surface of the water tank 12. Next, expandable foam insulation material 30 is placed in the annular space 16 above the annular collar 22 filling the annular space 16 above the collar 22. In FIGS. 1, 4, 6 and 7, the expanding foam 30 exerts a radial force against the outer annular lip 34 of the trough 28 of the collar 22 forcing the lip 34 tightly against the interior wall surface of the outer shell 14 increasing the sealing force at the interface of the collar 22 and interior surface of the outer shell 14. In FIG. 2, the expanding foam 30 exerts a radial force against the inner annular lip 36 of the trough 28 of the collar forcing the lip 36 tightly against the exterior wall surface of the water tank 12 increasing the sealing force at the interface of the collar and exterior surface of the water tank 12. With reference to FIGS. 1, 4, 6 and 7, a layer 32 of heat insulation material can be located in the annular space 16 beneath the collar 22.

The water heater constructions 10 shown in FIGS. 3, 5 and 8 can be assembled by first positioning the collar 22 of thermal insulation material around the interior wall surface of the outer shell 14 with the outer circumferential edge 24 in contact with the interior wall surface of the outer shell 14 at a preselected location therealong, and attaching the collar 22 thereto by using adhesive or tape 50. As shown in FIG. 3, the collar 22 is located between the top end and bottom end of the shell 14, but it can be located at the bottom end of the shell 14 as shown in FIGS. 5 and 8. Next, the outer shell 14 is located at the top end of an coaxial with the water tank 12 and is moved coaxially in a downward direction over the full length of the water tank 12. Alternatively, the water tank 12 can be located at the bottom end of and coaxial with the outer shell 14 and is moved coaxially in an upward direction into the shell 14 the full length of the shell 14. The collar 22 is then radially compressed between the outer shell 14 and inner water tank 12 in the annular space 16 with the annular lip 36 overlaying the exterior wall surface of the water tank 12. Next, expandable foam material 30 is placed in the annular space 16 above the annular collar 22 and is allowed to expand in situ filling the annular space 16 above the annular collar 22. With reference to FIG. 3, the expanding foam 30 exerts a radial force against the outer annular lip 34 of the trough 28 of the collar 22 forcing the lip 34 tightly against the interior wall surface of the outer shell 14 increasing the sealing force at the interface of the collar 22 and interior surface of the outer shell 14, and exerts a radial force against the inner annular lip 36 of the trough 28 of the collar forcing the lip 36 tightly against the exterior wall surface of the water tank 12 increasing the sealing force at the interface of the collar 22 and exterior surface of the water tank 12.

With reference to FIGS. 5 and 8, the inner perimeter margin 40 Of the collar 22 is deflected or displaced in a generally upward direction to overlay the exterior wall surface of the water tank forming lip 36 of the trough 28 at the top side of the collar 22. Expandable foam insulation material 30 is placed in the annular space 16 above the annular collar 22 and is allowed to expand in situ filling the annular space 16 above the annular collar 22. The expanding foam material 30 exerts a radial force against the lip 36 formed by the upturned perimeter margin 40 forcing the lip 36 tightly against the exterior wall surface of the water heater 12 increasing the sealing force at the interface of the collar 22 and exterior surface of the water heater 12.

The water heater constructions 10 shown in FIGS. 9 and 10 is assembled first by positioning the outer shell 14 concentrically over the inner water tank 12 defining the annular space 16 therebetween. Next, the annular collar of FIGS. 17 or 18 is positioned at the top end of the assembly in alignment with the annular space 16 and is forced or pushed downwardly into the annular space 16 to a desired position either between the top and bottom ends of the shell 14 or at the bottom end of the shell 14. The collar 22 is radially compressed between the outer shell 14 and inner water tank 12 in the annular space 16. With reference to FIG. 9 with the collar 22g of FIG. 17 the outer perimeter margin 38g is displaced or deflected in a generally upward direction forming an annular lip 34g against the interior wall surface of the outer shell 14 and the inner perimeter margin 40g of the collar 22g is deflected or displaced in a generally upward direction forming an annular lip 36g against the exterior wall surface of the inner water tank 12 with an annular trough 28g defined between the lips 34g and 36g at the top of the collar 22g. With reference to FIG. 10, with the collar 22h of FIG. 18, the outer perimeter margin 38h is distorted or displaced forming an annular lip 34h against the interior wall surface of the outer shell 14 and the inner perimeter margin 40h of the collar 22h is distorted or displaced forming an annular lip 36h against the exterior wall surface of the water tank 12 with an annular trough 28h defined between the lips 34h and 36h at the top of the collar 22h. In the embodiments of FIGS. 9 and 10 expandable foam insulation material 30 is placed in the annular space 16 above the annular collar 22 and is allowed to expand in situ filling he annular space 16 above the annular collar 22. The expanding foam material exert a radial force against the lip 34 forcing it against the interior wall surface of the shell 14 and a radial force against the lip 36 forcing it against the exterior wall surface of the water tank 12.

The water heater constructions 10 shown in FIGS. 1, 3, 4, 6, 7 and 10 including the fiberglass insulation layer 32 beneath the collar 22 in the annular space 16 is advantageously used when the water heater construction 10 is gas-fired utilizing a combustion chamber at the bottom end of water tank 12. The collar 22 is positioned just above the elevation of the combustion chamber and the insulation layer 32 surrounds the bottom end of the water tank at the combustion chamber. The water heater constructions 10 shown in FIGS. 2, 5, 8 and 9 is advantageously used when the water heater is electronically heated and does not have a combustion chamber.

The tape member 50 serves a dual purpose and can be configured to work with the assembly of collar 22 in a number of ways. When tape member 50 is used to attach the collar to the tank (FIGS. 1, 2, 4, 6 and 7), it is the tank which moves down into the shell or the shell which moves up around the tank. Either way, the direction of relative motion allows the outer edge or lip of the corresponding collar to flex upwardly along the shell side wall thereby creating the aforementioned trough 28. As this outer edge or lip flexes, the tape member holds the collar in position against the tank. In certain configurations with certain collar styles, the amount of flexing is less and in some instances the trough is created in part by the starting shape of the collar. See, for example, FIG. 2.

When the reverse approach is used, i.e., the collar is attached to the shell, the direction of relative movement between the shell and tank is reversed such that the inside edge or lip of the collar flexes upwardly along the outer wall surface of the tank as is shown in FIGS. 5 and 8. FIG. 3 represents a situation where some flexing occurs, but the starting shape of the collar is as much a factor in the creation of the trough 28 as is any flexing of a lip or edge.

When the tape member is a rigid tape or adhesive member, such as an adhesive or tape covered piece of metal or plastic, other assembly techniques are contemplated. One option is to use the member 50 as a mechanical stop. While the concept of first assembling the shell and tank and then pushing the collar downwardly into the annular clearance space is covered in FIGS. 9 and 10, member 50 can be first attached to the shell or tank and used as a physical stop for the advancing collar. In this manner the desired location for the collar an be preset by attaching member 50 at the desired depth (or height) relative to either the shell or tank. Since one arrangement for the tape or adhesive member 50 includes covering it with a material that provides a tacky, adhering surface, attachment of the member to either the shell or the tank is quickly and easily accomplished.

A still further option with regard to member 50 is to retain the L-shaped cross-section as shown in the various figures and use a tape or adhesive coating on the surface which attaches to the tank or shell. The use of tape or adhesive on the surface of member 50 which contacts the collar is optional. If the collar is not to be bonded to member 50, then the collar merely rests on member 50 and the length of the horizontal portion extending radially between the tank and the shell becomes more important. Further, in this arrangement, depending on the collar style and where member 50 is attached, the direction of relative movement between the shell and tank may need to be reversed. For example, in the FIG. 1 arrangement, if the collar is merely resting atop member 50 and the tank (and collar) move upwardly into the shell from the bottom edge of the shell, the collar will tend to ride up and/or become twisted and distorted. This can be avoided by lowering the shell down over the tank or by raising the tank upwardly into the shell. The downward force on the outer edge of the collar is offset by the rigidity and support offered by tape member 50 such that the collar stays in position even though the movement of the tank into the shell tends to try and push the collar down. One obvious change with this approach is that the outer lip or edge is not turned upwardly in order to create the desired trough 28 and thus collar styles which are effectively formed with their own trough such as collar 22a, 22b, 22c and 22f are more suitable with this assembly approach.

Figure 19:
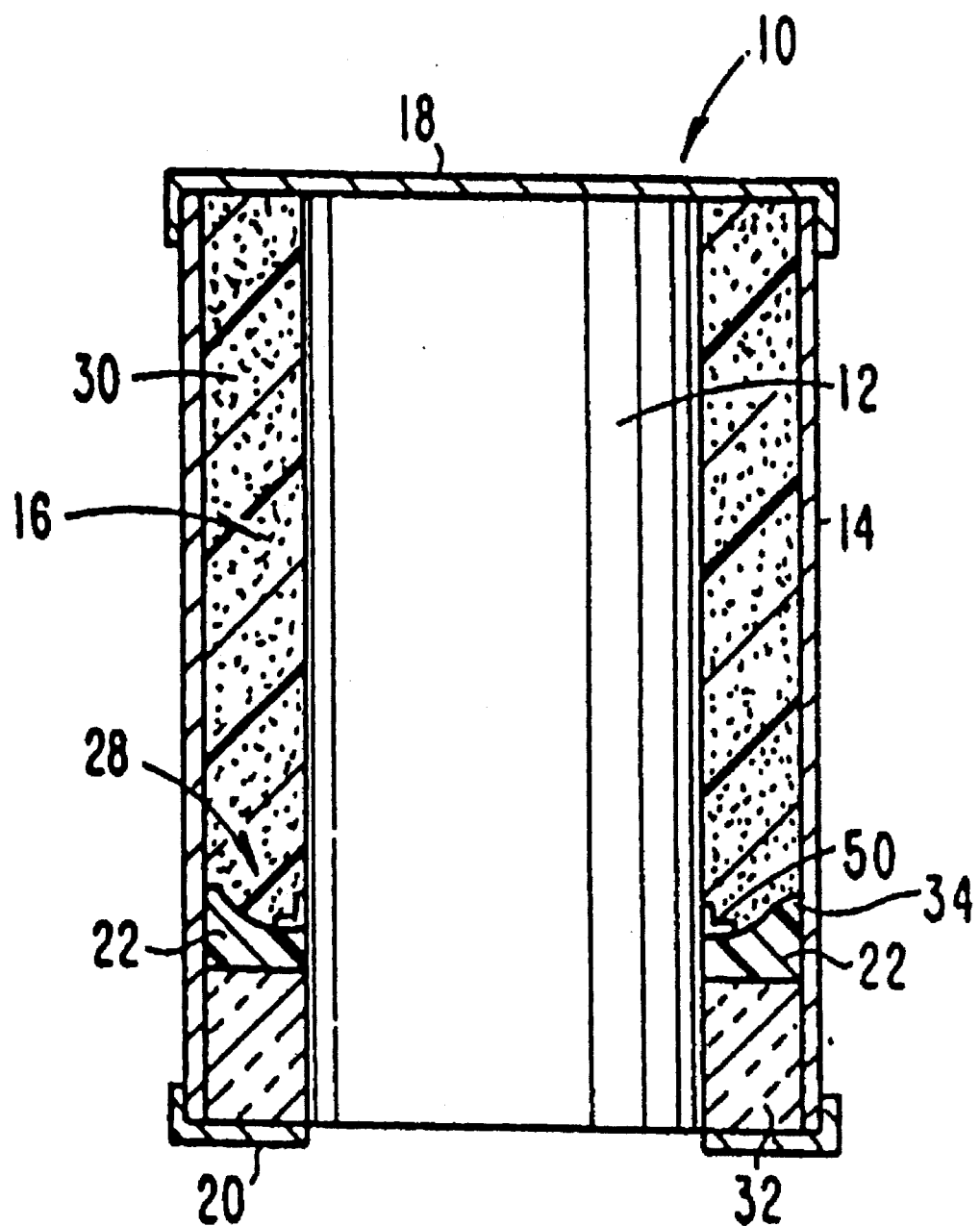
FIG. 19 is a schematic representation, in transverse cross-section, of a water heater construction according to a typical embodiment of the present invention.

A still further option is to use the tape member 50 as a rigid stop mounted to the tank, but place it on top of the collar as is illustrated in FIG. 19 which is virtually identical to FIG. 1 except for the position of the member 50 relative to the collar. When member 50 is positioned on the tank and placed above the collar, then the tank can be moved downwardly into tile shell or the shell upwardly around the tank and the outer edge or lip of the collar flexes upwardly in order to create trough 28. This can be done whether or not member 50 is flexible tape or a rigid tape member and whether or not the collar is adhesively attached to member 50. The same options are valid though in a reverse direction when member 50 is attached to the shell and positioned below the 1collar. Also note that the specific collar style is important in evaluating and employing all of the various options for member 50 and its positioning.

Figure 20:
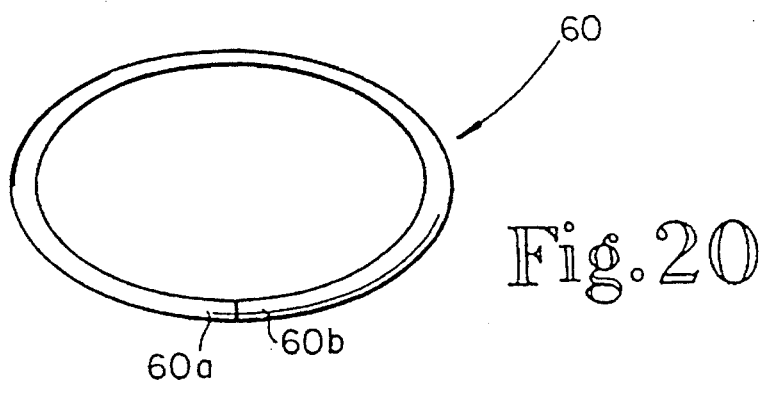
FIG. 20 is a perspective view of an annular ring collar fabricated from a length of hollow tubing.

Referring to FIG. 20, there is illustrated an annular collar 60 which is of an annular ring shape having a hollow interior such that its lateral cross-section is also an annular ring shape. In the preferred embodiment, collar 60 begins as a length of polyethylene tubing having a lateral cross-section whose outside diameter size in a free state is larger than the radial width of the annular clearance space 61 between the inner water tank 62 and the outer shell 63 of a hot water heater (see FIGS. 21 and 22). The free ends 60a and 60b are joined together by tape or adhesive so as to create a toroid shape for collar 60. The joining together of the free ends may be done prior to moving the toroid collar over the associated plumbing fittings which connect to the tank, if the collar can clear such fittings. Otherwise, the ends must be joined after the tubing length is positioned free of interference with the fittings. As to alternative materials for collar 60, it can be constructed out of any one of the flexible foam materials.

Shell 68 is a substantially horizontal, rigid mechanical stop that sets the position for the collar when it is pushed into position. It FIG. 21 shelf 68 is attached to the inner surface 65 of the outer shell 63. In FIG. 22, shell 68 is attached to the outer surface 67 of the water tank 62. Both of these configurations assume that the collar is pushed down from the top into the space between an assembled shell and tank. The space above the collar is filled with liquid, foam-in-place insulation.

When collar 60 is positioned within the annular clearance space 61 such that its outside diameter lies substantially in a horizontal plane relative to the upright orientation of the hot water heater, the outer wall portion 64 of the collar is compressed against the inner surface 65 of outer shell 63. The inner wall portion 66 of the annular collar is compressed against the outer surface 67 of the inner water tank 62. The outer wall portion flattens slightly due to the compressive force which is created by the oversized nature of the collar relative to the radial width of the annular clearance space between the inner water tank and the outer shell. Likewise, the inner wall portion of the annular collar flattens slightly due to that same compressive force. If the annular collar was sized such that its lateral section diameter was just equal to the radial width of the annular clearance space, then there would be a line-to-line fit between the collar and the tank and between the collar and the shell and thus only a line of contact at each location for sealing the lower portion of the annular clearance space. By oversizing the lateral diameter size of the collar relative to the annular clearance space, the inside and outside diameter surfaces of the collar flatten slightly thereby providing a larger surface area of sealing contact between the collar and the tank and between the collar and the shell.

Although the material used for the collar may be flexible and resilient, the hollow nature of the collar provides a desired flexibility for the collar to deform in order to fit within the annular clearance space. The interior of collar 60 remains hollow and is not filled with any other material. When a solid material collar is used as opposed to a hollow collar, the material which is used for the collar must provide the flexibility and resiliency in order for that shape to be conformed to fit within the annular clearance space. Suitable materials for annular collar 60 include polyethylene tubing and polyurethane tubing.

Figure 21:
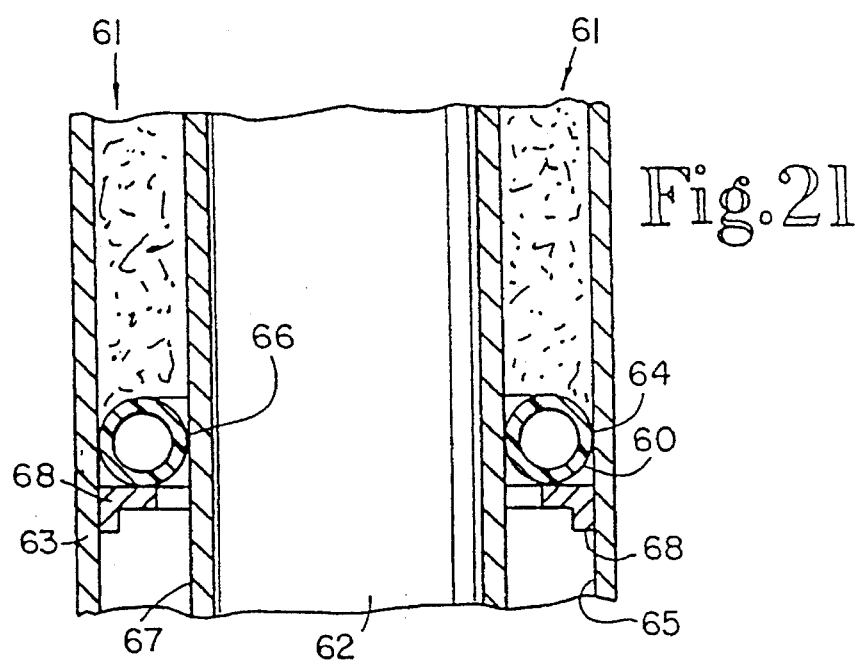
FIG. 21 is a partial, front elevational view in full section of the FIG. 20 collar disposed between a water heater tank and outer shell, resting against an abutment.
Figure 22:
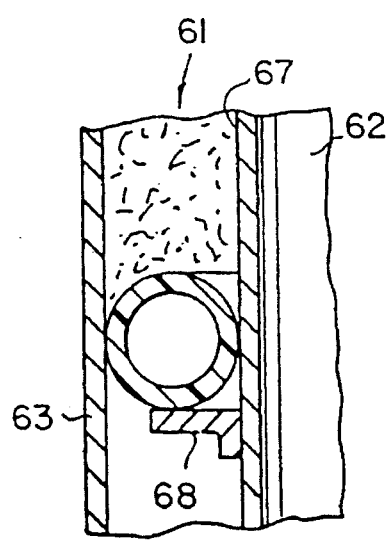
FIG. 22 is a partial, front elevational view in full section of the FIG. 20 collar disposed between a water heater tank and outer shell, resting against an abutment.
Figure 23:
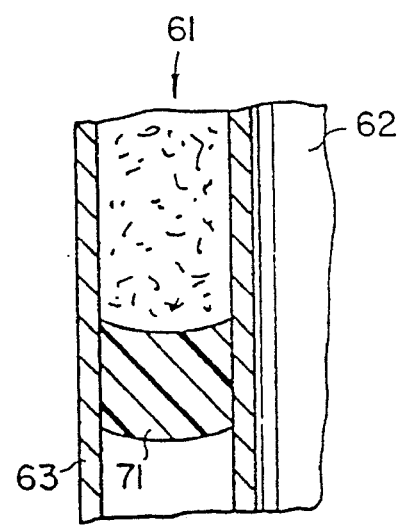
FIG. 23 is a partial, front elevational view in full section of an alternate collar design disposed between a water heater tank axed shell.
Figure 27:
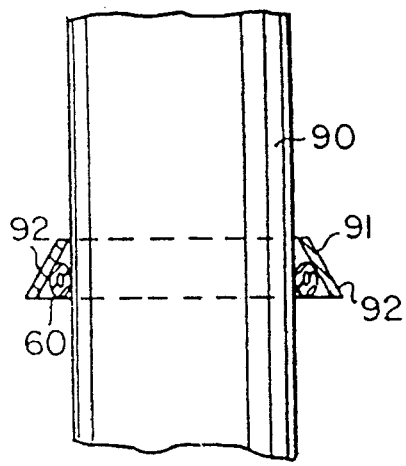
FIG. 27 is a front elevational view of a water heater tank and collar in combination with a compressing sleeve.
Figure 28:
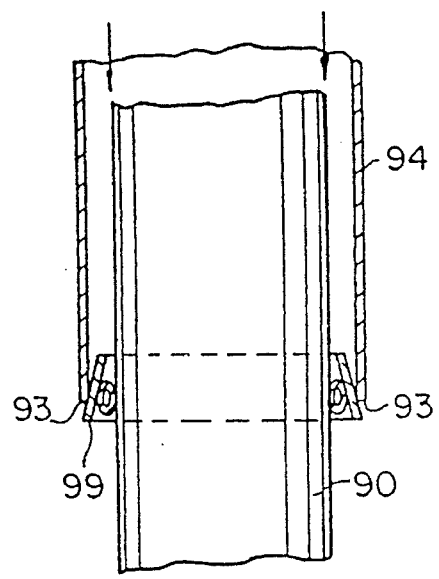
FIG. 28 is a partial, front elevational view of the FIG. 27 combination as the outer shell is lowered into position.
Figure 29:
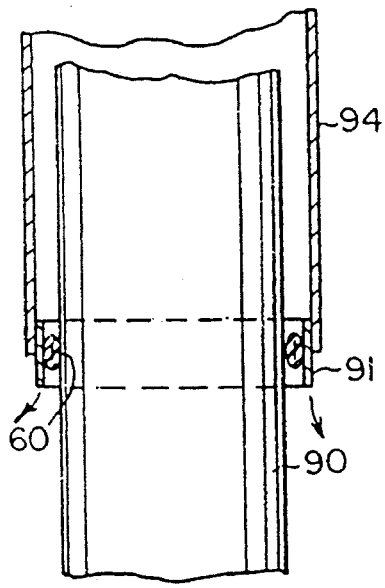
FIG. 29 is a partial, front elevational view of the FIG. 27 combination prior to removal of the compressing sleeve.
Figure 30:
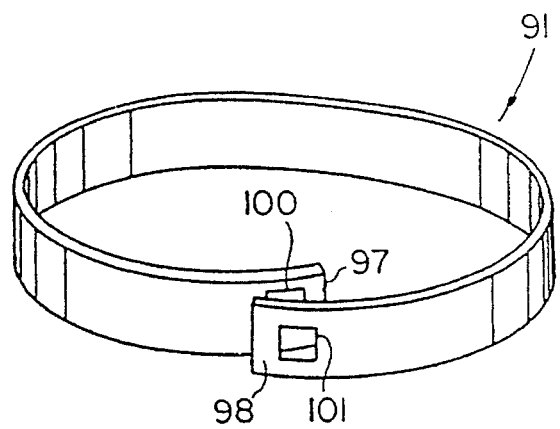
FIG. 30 is a perspective view of the compressing sleeve suitable for use in combination with the FIG. 20 collar as illustrated in FIGS. 27–29.

While the focus of FIGS. 20, 21 and 22 is on the design of a hollow tube formed into an annular collar, other cross-sectional shapes for annular collars of the present invention have already been discussed and described. Solid cross-sectional shapes for the annular collar such as a circular cross-section (FIG. 23) and a rectangular cross-section (FIG. 24) can be used to seal off one end of the annular clearance space 61 between the tank 62 and the outer shell 63. With each of these cross-sectional shapes, the annular collars 71 and 72, respectively, begin as a length of material which is then coiled into a toroid form and the free ends are secured to one another. If the annular collar is installed after assembly of the tank and shell by pushing the collar into and through the annular clearance space, talcum powder provides a suitable lubricant (although other dry or wet lubricants could be used) enabling the collar to be installed more easily. In this manner of assembly, the flattened inside and outside diameter portions of the collar create a wiping action against the outside surface of the inner tank and against the inside surface of the shell insuring that at the final position of the collar tight sealing engagement will be created so that liquid foam-in-place insulation material which is injected into the annular clearance space above the collar will not leak past the collar. If the annular collar is first attached to the shell or tank prior to final assembly of the other member, talcum powder (or other lubricant) is still a important item in the assembly process enabling the tank or shell to slide across the abutting surface of the annular collar by introducing the powder at that interface. It may be necessary to rotate the shell after positioning it over the tank in order to line up openings in the shell with controls or plumbing fittings on the tank.

As mentioned, the final step after the tank, shell and collar are assembled is to inject liquid, foam-in-place expandable foam insulation into the annular clearance space above the annular collar.

In any configuration where the collar is positioned around the tank before the shell is assembled but where the collar is not in its final position, the collar is pushed into final position after assembly of the shell. After the shell is assembled, the portion of the annular clearance space above the collar is filled with a liquid, foam-in-place insulation material.

Referring to FIG. 25, there is illustrated the installation of collar 60 between the outer surface of the inner tank 62 and the inner surface of the outer shell 63. The tank is illustrated in broken, fragmentary form in order to show enlarged details of the collar. In this arrangement, there is no stop or shelf 68 attached to either the inner surface 65 of the outer shell 63 or the outer surface 67 of the inner water tank 62. In order to position collar 60 at the desired location between the tank and shell, after the tank and shell are assembled, some type of pusher or plunger device is needed. It is important for the pushing device to achieve two conditions relative to the collar. First, the device needs to have an appropriate depth marking which will denote a point of axial depth relative to the tank or shell's top edge. In this manner, the collar will be positioned axially along the side wall of the tank at a location above the combustion/burner area which is to be free of any liquid, foam-in-place insulation material, of the type injected into the annular clearance space 61 above annular collar 60. The second requirement for the pushing device is that the depth marking be made in a substantially horizontal manner as well as being substantially parallel with the lower edge of the device. With this feature, the horizontal marking can be lined up on the tank or shell top edge and thereby guarantee that the annular collar will be substantially horizontal within the annular clearance space. Only when the collar is horizontal will it have the maximum degree of compression and in turn the maximum interference fit for sealing the bottom end of the annular clearance space closed. If the collar is at an inclined angle, then the distance across the annular clearance space between the tank and shell, through the plane of the collar, is larger than if disposed horizontally and there will not be the same degree of interference fit, if any, between the collar and the tank and between the collar and the shell.

Referring to FIG. 26, a suitable pushing device 80 is illustrated and is designed in accordance with the two key requirements described and discussed above. Device 80 is a generally part-cylindrical sleeve which is cylindrical for approximately 270 degrees of its circumference and is then open for the last 90 degrees of its circumference. Edges 81, 82 define the boundaries of the 90 degree opening 83. Without opening 83, device 80 would interfere with plumbing connections and fittings or with operational controls associated with the tank and shell. With opening 83, device 80 can be fitted over and around such connections, fittings and controls and positioned axially with the tank and shell over the annular clearance space. Further, any sidewall connections or controls entering the tank will be avoided by the pushing device as it is pushed downwardly through the annular clearance space to properly position collar 60. Horizontal line 84 which goes completely around device 80 denotes the alignment and depth marking for device 80 and line 84 is substantially parallel to lower edge 85. Lower edge 85 is fabricated such that it is substantially horizontal (perpendicular) relative to the longitudinal axis 86 of device 80, which is as mentioned, part-cylindrical. Consequently, line 84 is substantially horizontal relative to the longitudinal axis 86. A pair of handles 87 is provided on opposite sides of device 80 for handling and lowering the device. One handle is hidden from view.

In use, device 80 is used after a collar such as collar 60 is positioned in the open top of the annular clearance space 61 between the tank and shell. Device 80 is next positioned in turn such that opening 83 clears any plumbing fittings or controls. Device 80 is lowered in a generally concentric fashion around, the tank such that edge 85 contacts collar 60. As device 80 is pushed in a downward direction through the annular clearance space, it pushes the collar into position. By aligning line 84 with the top edge of the outer shell 63 the correct depth for the collar into the annular clearance space is automatically set. By assuring that the entirety of line 84 is correctly aligned with the shell top edge, the collar will be horizontal relative to the longitudinal axis of device 80 but more importantly the collar will be horizontally disposed in the annular clearance space thereby maximizing the degree of interference fit between the shell 63 and tank 62.

Referring to FIGS. 27, 28, 29 and 30, a different collar compression technique is illustrated. Inner water tank 90 of a hot water heater is initially fitted with collar 60, which is the hollow, polyethylene tubing style of collar previously described, though it is important to note that the illustrated technique may be used with different collar configurations as described In FIGS. 31 and 32. Disposed over the upper, outer portion of collar 60 is a lead-in sleeve 91 which completely encircles the collar and is downwardly and outwardly flared so as to present an inclined top surface 92 to the lower, bottom edge 93 of the downwardly advancing outer shell 94. The free ends 97 and 98 of sleeve 91 (see FIG. 30) are free to slide relative to each other in overlapping relationship. Consequently, with the continued downward advancement of the outer shell, the slanted or inclined nature of sleeve 91 flattens out to more of a vertical configuration thereby conforming the sleeve to a generally cylindrical configuration. As the lower edge 99 of sleeve 91 is pushed inwardly its circumference lessens. In order to accommodate this smaller circumference, free ends 97 and 98 of sleeve 91 slide over each other so as to create a truer cylindrical configuration and less of a conical configuration.

The free ends of sleeve 91 are fitted with hand holes 100 an 101 which may be used to manually draw the sleeve into a cylindrical form around the collar. Whether the sleeve is acted upon by the shell or manually shaped, it inwardly compresses collar 60 so that the shell can pass over he collar without interference. Once the shell's lower edge 93 is substantially even with the midpoint of collar 60, the lead-in sleeve 91 may be removed by pulling it down between the shell and collar. As the sleeve is moved away the free ends are able to come apart allowing the sleeve to be removed in much the same fashion as a belt may be removed once the free ends are unbuckled or disconnected. As the sleeve 91 is removed, any spring back of collar 60 is restrained by the outer cylindrical shell enabling the shell to be moved into final position relative to the tank without tearing or dislodging the collar from its originally selected and fixed position in the annular clearance space relative to the tank.

Figure 31:
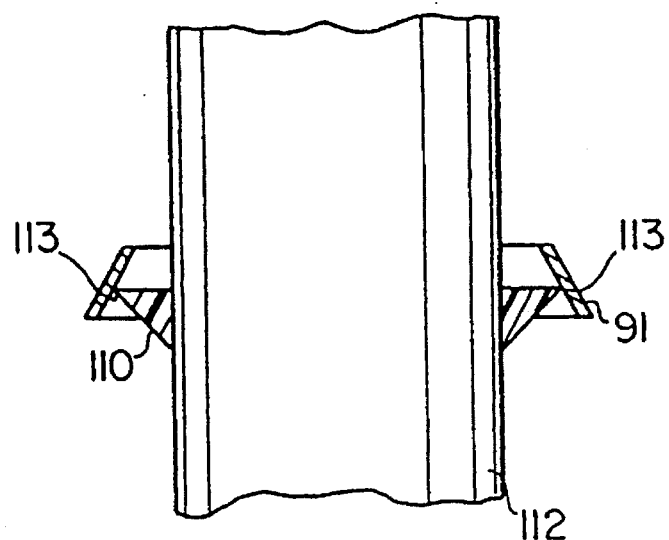
FIG. 31 is a partial, front elevational view in full section of the FIG. 30 compressing sleeve used in combination with a differently styled collar.
Figure 32:
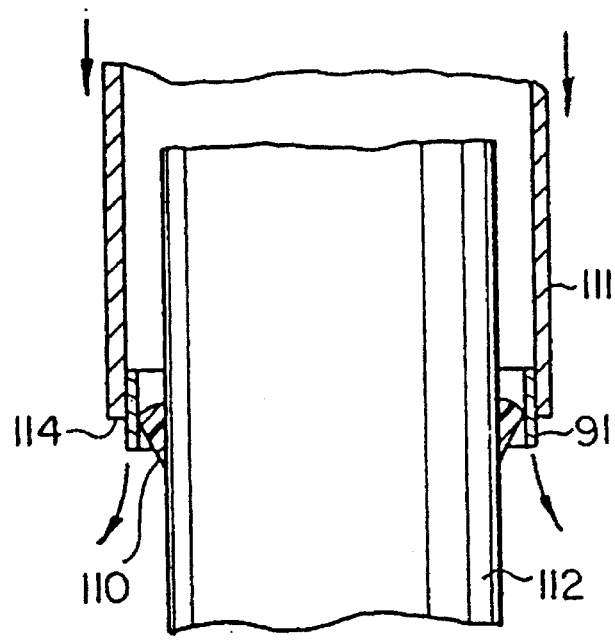
FIG. 32 is a partial, front elevational view in full section of the FIG. 31 combination with the outer shell installed prior to removal of the compressing sleeve.

Referring to FIGS. 31 and 32, sleeve 91 is used in conjunction with a differently styled collar. In FIG. 31, collar 110 has an inwardly tapered wedge shape with the greatest radial thickness at the top or upper edge. If the shell 111 is lowered down over the tank 112, it will contact edge 113 of collar 110. In order to compress edge 113 so that the shell will pass without interference and yet have a sealed interface between the collar and shell and between the collar and tank, sleeve 91 is used.

It should be noted that with regard to FIGS. 27–32, the lead-in or compression sleeve 91 takes the place of any wet or dry lubricant which might otherwise be desirable in order to install the selected collar. In those configurations where the collar is pushed into the annular clearance space, such as by the use of pushing device 80, a lubricant is desirable. However, when the collar is initially secured to the tank at the desired location and is merely radially compressed by the sleeve for installation of the outer shell, then the lubricant is not necessary.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A water heater construction comprising:

an inner water tank;

an outer shell located in spaced relation to and surrounding said inner water tank so as to define a clearance space between said inner water tank and said outer shell;

a stop member attached to said inner water tank and defining therewith an abutment surface; and a predetermined length of resilient foam insulation material having two free ends and a generally circular lateral cross-section and being formed into a collar by bonding the two free ends together, said collar being positioned within said clearance space against said abutment surface, said collar having a free state radial width which is greater than the radial width of said clearance space at a location adjacent said abutment surface and arranged in sealing contact across said clearance space at said abutment surface location so as to prevent the passage of liquid foam through said clearance space, past said collar.

2. A water heater construction comprising:

an inner water tank;

an outer shell located in spaced relation to and surrounding said inner water tank so as to define a clearance space between said inner water tank and said outer shell;

a stop member attached to said inner water tank and defining therewith an abutment surface; and a predetermined length of resilient foam insulation material having a generally circular lateral cross-section and being formed into a collar, said collar being positioned within said clearance space against said abutment surface, said collar having a free state radial width which is greater than the radial width of said clearance space at a location adjacent said abutment surface and arranged in sealing contact across said clearance space at said abutment surface location so as to prevent the passage of liquid foam through said clearance space, past said collar.

3. A water heater construction comprising:

an inner water tank;

an outer shell located in spaced relation to and surrounding said inner water tank so as to define an annular clearance space between said inner water tank and said outer shell; and a generally cylindrical rod length of resilient insulation material having a generally circular lateral cross-section and being formed into an annular collar and located within the annular clearance space and being designed and arranged in sealing contact across said clearance space so as to prevent the passage of liquid foam through said clearance space, past said collar, said annular collar being free of any tubing connection through the exterior surface of said annular collar.

4. A water heater construction comprising:

an inner water tank;

an outer shell located in spaced relation to and surrounding said inner water tank so as to define an annular clearance space between said inner water tank and said outer shell; and a generally cylindrical rod length of resilient insulation material having two free ends and a generally circular lateral cross-section and being formed into a collar by bonding the two free ends together, said collar being located within the annular clearance space and being designed and arranged in sealing contact across said clearance space so as to prevent the passage of liquid foam through said clearance space, past said collar, said collar being free of any tubing connection through the exterior surface of said collar.

5. A water heater construction comprising:

an inner water tank;

an outer shell located in spaced relation to and surrounding said inner water tank so as to define an annular clearance space between said inner water tank and said outer shell; and a generally cylindrical rod length of resilient insulation material having a generally circular lateral cross-section and being formed into an annular collar and located within the annular clearance space and being designed and arranged in sealing contact with both the inner wall surface of the outer shell and the outer wall surface of the inner water tank, said annular collar being free of any tubing connection through the exterior surface of said annular collar.

6. The water heater construction of claim 5 wherein said rod length of resilient insulation material has two free ends and said collar is formed by bonding the two free ends together.

7. A water heater construction comprising:

an inner water tank;

an outer shell located in spaced relation to and surrounding said inner water tank so as to define a clearance space between said inner water tank and said outer shell;

an abutment member located in said clearance space and being positioned around said inner water tank;

an annular foam collar located in said clearance space and positioned against said abutment member and against an inner wall surface of said outer shell, said foam collar having a generally circular lateral cross-section and being arranged into a compressed condition by contact with the inner wall surface of said outer shell so as to establish a sealed interface between the outer shell and the annular foam collar; and liquid foamed-in-place insulation disposed in said clearance space above said annular foam collar.

8. A water heater construction comprising:

an inner water tank;

an outer shell located in spaced relation to and surrounding said inner water tank so as to define a clearance space between said inner water tank and said outer shell;

an abutment member located around an inner wall surface of the outer shell;

an annular foam collar located in said clearance space and positioned against said abutment member and against an outer wall surface of said inner water tank, said foam collar having a generally circular lateral cross-section and being arranged into a compressed condition by contact with the outer wall surface of said inner water tank so as to establish a sealed interface between the inner water tank and the annular foam collar; and liquid foamed-in-place insulation disposed in said clearance space above said annular foam collar.

9. A water heater construction comprising:

an inner water tank;

an outer shell located in spaced relation to and surrounding said inner water tank so as to define an annular clearance space between said inner water tank and said outer shell; and a generally cylindrical rod length of insulation material having a generally circular lateral cross-section and being formed into an annular collar and located within the annular clearance space and being designed and arranged in sealing contact with both the inner wall surface of the outer shell and the outer wall surface of the inner water tank, said annular collar being free of any tubing connection through the exterior surface of said annular collar.

* * * * *

UNITED STATES PATENT AND TRADEMARK OFFICE
CERTIFICATE OF CORRECTION

PATENT NO.  : 5,509,566
DATED       : April 23, 1996
INVENTOR(S) : Thomas E. Nelson It is certified that error appears in the above-identified patent and that said Letters Patent is hereby corrected as shown below:

In column 1, at line 17, replace "termally" with --thermally--.

In column 4, at line 31, replace "axed" with --and--.

In column 5, at line 21, replace "o" with --to--.

In column 7, at line 20, replace "an" with --and--.

In column 8, at line 54, replace "Of" with --of--.

In column 9, at line 28, replace "he" with --the--.

In column 9, at line 29, replace "exert" with --exerts--.

In column 10, at line 49, replace "tile" with --the--.

In column 10, at line 56, replace "lcollar" with --collar--.

In column 11, at line 11, replace "It" with --In--.

In column 13, at line 44, replace "In" with --in--.

Signed and Sealed this

Twenty-sixth Day of November 1996

Attest:

BRUCE LEHMAN

*Attesting Officer*    *Commissioner of Patents and Trademarks*